US008395619B1

(12) United States Patent
Diard

(10) Patent No.: US 8,395,619 B1
(45) Date of Patent: Mar. 12, 2013

(54) SYSTEM AND METHOD FOR TRANSFERRING PRE-COMPUTED Z-VALUES BETWEEN GPUS

(75) Inventor: Franck R. Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1194 days.

(21) Appl. No.: 12/244,705

(22) Filed: Oct. 2, 2008

(51) Int. Cl.
*G06T 15/40* (2011.01)
*G06T 15/00* (2011.01)

(52) U.S. Cl. .................................... 345/422; 345/419

(58) Field of Classification Search .......... 345/422, 345/502, 503, 506, 519
See application file for complete search history.

(56) References Cited

U.S. PATENT DOCUMENTS

| 5,579,455 | A | * | 11/1996 | Greene et al. | 345/422 |
|---|---|---|---|---|---|
| 5,613,050 | A | * | 3/1997 | Hochmuth et al. | 345/422 |
| 5,812,144 | A | * | 9/1998 | Potu et al. | 715/202 |
| 5,982,373 | A | * | 11/1999 | Inman et al. | 345/419 |
| 6,014,125 | A | * | 1/2000 | Herbert | 345/660 |
| 6,407,741 | B1 | * | 6/2002 | Morein et al. | 345/555 |
| 6,480,205 | B1 | * | 11/2002 | Greene et al. | 345/631 |
| 6,510,246 | B1 | * | 1/2003 | Boliek et al. | 382/232 |
| 6,525,726 | B1 | * | 2/2003 | Xie et al. | 345/421 |
| 6,636,215 | B1 | * | 10/2003 | Greene | 345/422 |
| 6,646,639 | B1 | * | 11/2003 | Greene et al. | 345/422 |
| 6,664,958 | B1 | * | 12/2003 | Leather et al. | 345/422 |
| 6,828,983 | B1 | * | 12/2004 | Vijayakumar et al. | 345/613 |
| 6,924,801 | B1 | * | 8/2005 | Dorbie | 345/422 |
| 6,985,151 | B1 | * | 1/2006 | Bastos et al. | 345/519 |
| 7,023,437 | B1 | * | 4/2006 | Voorhies et al. | 345/420 |
| 7,053,901 | B2 | * | 5/2006 | Huang et al. | 345/503 |
| 7,061,495 | B1 | * | 6/2006 | Leather | 345/506 |
| 7,064,752 | B1 | * | 6/2006 | Larson | 345/419 |
| 2003/0085893 | A1 | | 5/2003 | Morein et al. | |
| 2003/0151606 | A1 | * | 8/2003 | Morein | 345/422 |
| 2005/0041031 | A1 | * | 2/2005 | Diard | 345/505 |
| 2005/0122338 | A1 | * | 6/2005 | Hong et al. | 345/546 |
| 2006/0033735 | A1 | * | 2/2006 | Seiler et al. | 345/421 |
| 2006/0282604 | A1 | * | 12/2006 | Temkine et al. | 710/314 |

(Continued)

OTHER PUBLICATIONS

Dominik Goddeke, Performance Tuning, NVidia,Developer presentation, 2005, 5 pages, retrieved from: http://www.mathematik.tu-dortmund.de/~goeddeke/gpgpu/oldstuff/PerformanceTuning.pdf.*

(Continued)

*Primary Examiner* — Daniel Hajnik
(74) *Attorney, Agent, or Firm* — Patterson & Sheridan, LLP

(57) ABSTRACT

One embodiment of the present invention sets forth a method for pre-computing Z-values using an IGPU and, subsequently, conveying these Z-values to a DGPU. The graphics driver partitions the display into rectangular M-by-N tiles of pixels. For each tile, the graphics driver generates a quad geometry that encompasses the corresponding pixels. For each image frame, the graphics driver configures the IGPU to generate and down-sample a Z-buffer, creating a coarse Z-texture that contains a Z-value for each tile. The graphics driver transfers the coarse Z-texture to the system memory and configures the DGPU to apply the coarse Z-texture to the quad geometries, thereby generating a coarse Z-buffer in which the M-by-N pixels included in each tile are assigned the Z-value for the particular tile. Among other things, this technique enables the IGPU to pre-compute Z-values for the DGPU without straining the system memory bandwidth or defeating the Z-buffer compression techniques used by the DGPU.

20 Claims, 9 Drawing Sheets

U.S. PATENT DOCUMENTS

2008/0068375 A1  3/2008  Min et al.

OTHER PUBLICATIONS

Anselm Grundhöfer et al., "Level of detail based occlusion culling for dynamic scenes", Proceedings of the 3rd international conference on Computer graphics and interactive techniques in Australasia and South East Asia (GRAPHITE '05), Nov. 30-Dec. 2, 2005, ACM, New York, NY, USA, pp. 37-45.*

Mark Harris, "Mapping computational concepts to GPUs", Matt Pharr, editor, GPU Gems 2, chapter 31, pp. 493-508, AddisonWesley, Mar. 2005.*

Mark Harris, "GPGPU: General-Purpose Computation on GPUs", Game Developers Conference 2005, Mar. 7-11, 2005, San Francisco, California, 52 pages.*

Jon Hasselgren and Thomas Akenine-Möller, "PCU: the programmable culling unit", ACM SIGGRAPH 2007 papers (SIGGRAPH '07), ACM, New York, NY, USA, Article 92, Aug. 5-9, 2007, 10 pages.*

Klosowski et al., "Efficient Conservative Visibility Culling Using the Prioritized-Layered Projection Algorithm", IEEE Transactions on Visualization and Computer Graphics, vol. 7, Issue 4, Oct. 2001, pp. 365-379.*

D. Luebke et al., "GPGPU: General-Purpose Computation on Graphics hardware", Proceedings of SIGGRAPH 2004, ACM Transactions on Graphics, Aug. 2004, 289 pages.*

Sander et al., "Computation culling with explicit early-z and dynamic flow control", GPU Shading and Rendering, 33rd International Conference and Exhibition on Computer Graphics and Interactive Techniques, (SIGGRAPH 2005), ACM SIGGRAPH Course 37 Notes, Aug. 2005, Chapter 10, 14 pages.*

Lorach, Tristan, Jan. 2007, "Soft Particles.," In the NVIDIA DirectX 10 SDK, Available online at http://developer.download.nvidia.com/SDK/10/direct3d/Source/SoftParticles/doc/SoftParticles_hi.pdf.*

Office Action dated Sep. 29, 2011 from U.S. Appl. No. 12/244,708.

Office Action dated Jun. 15, 2012 for U.S. Appl. No. 12/244,710.

* cited by examiner

SYSTEM AND METHOD FOR TRANSFERRING PRE-COMPUTED Z-VALUES BETWEEN GPUS

BACKGROUND OF THE INVENTION

1. Field of the Invention

The present invention relates generally to the field of graphics processing and more specifically to a system and method for transferring pre-computed Z-values between graphics processing units (GPUs).

2. Description of the Related Art

A typical computing system includes a central processing unit (CPU), an input device, a system memory, one or more graphics processing units (GPUs), and one or more display devices. A variety of software application programs may run on the computing system. The CPU usually executes the overall structure of the software application program and configures the GPUs to perform specific tasks in the graphics pipeline. Some computing systems include both an integrated (IGPU) and a higher-performance discrete GPU (DGPU). Such a computing system may support a hybrid performance mode in which the IGPU is configured to supplement the performance of the DGPU, thereby increasing the efficiency of the graphics pipeline.

In one approach to implementing a hybrid performance mode, the IGPU runs one image frame ahead of the DGPU, rendering only depth of field values (ignoring all color information) to establish the closest surfaces to the viewer. While rendering, the IGPU maintains the minimum Z-value, which corresponds to the closest depth of field value, for each pixel in the image frame using a two-dimensional array known as a Z-buffer. After the IGPU pre-computes the Z-buffer, a DMA (direct memory access) engine copies the Z-buffer from the IGPU local memory to the system memory and, subsequently, copies the pre-computed Z-buffer from the system memory to the DGPU local memory. The DGPU then renders the image frame with full shading (including color information), using the pre-computed Z-buffer to avoid rendering pixel fragments (i.e., the fragment of each pixel intersected by an object) in the image that would otherwise be occluded by closer geometries in the image being rendered. Ignoring the color information allows the IGPU to efficiently pre-compute the Z-buffer, while starting with the pre-computed Z-buffer allows the DPGU to forestall time-consuming shading operations.

One drawback to this approach, however, is that the size of the pre-computed Z-buffer that the DMA engine copies from the IGPU local memory to the DGPU local memory via the system memory is usually quite large. For example, for a 1600-by-1200 pixel image frame, the pre-computed Z-buffer may include nearly 8 MB of data. Transferring this large volume of data may strain the system memory bandwidth, thereby becoming a bottleneck in the graphics pipeline and hindering overall system performance. In addition, transferring the Z-buffer with a DMA engine oftentimes invalidates the Z-buffer compression techniques that the DGPU uses to efficiently process the Z-buffer. As a result, the DGPU has to use an uncompressed Z-buffer while rendering, which reduces the performance of the DGPU.

In another approach, the IGPU pre-computes the Z-buffer for an image frame, specialized hardware transfers the Z-buffer directly from the IGPU local memory to the DGPU local memory, and the DGPU renders the image frame using the pre-computed and compressed Z-buffer. While using this solution avoids system memory bandwidth limitations and retains Z-buffer compression, not all computing systems include the specialized hardware used to directly transfer the Z-buffer.

As the foregoing illustrates, what is needed in the art is a more efficient and flexible technique for transferring pre-computed Z-values between GPUs.

SUMMARY OF THE INVENTION

One embodiment of the present invention sets forth a method for transferring pre-computed z-values between graphics processing units (CPUs). The method includes the steps of partitioning a display surface into a set of tiles, where each tile includes a plurality of pixels, generating a full-screen quad having x and y coordinates corresponding to a boundary of the display surface, configuring a first GPU to render an image frame, where the first GPU writes a minimum z-value to a z-buffer for each pixel associated with the display surface, and configuring the first GPU to generate a coarse z-texture based on the full-screen quad and the minimum z-values written to the z-buffer.

One advantage of the disclosed technique is that it enables the first GPU to pre-compute Z-values for the DGPU without straining the system memory bandwidth or defeating the Z-buffer compression techniques used by a second GPU.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
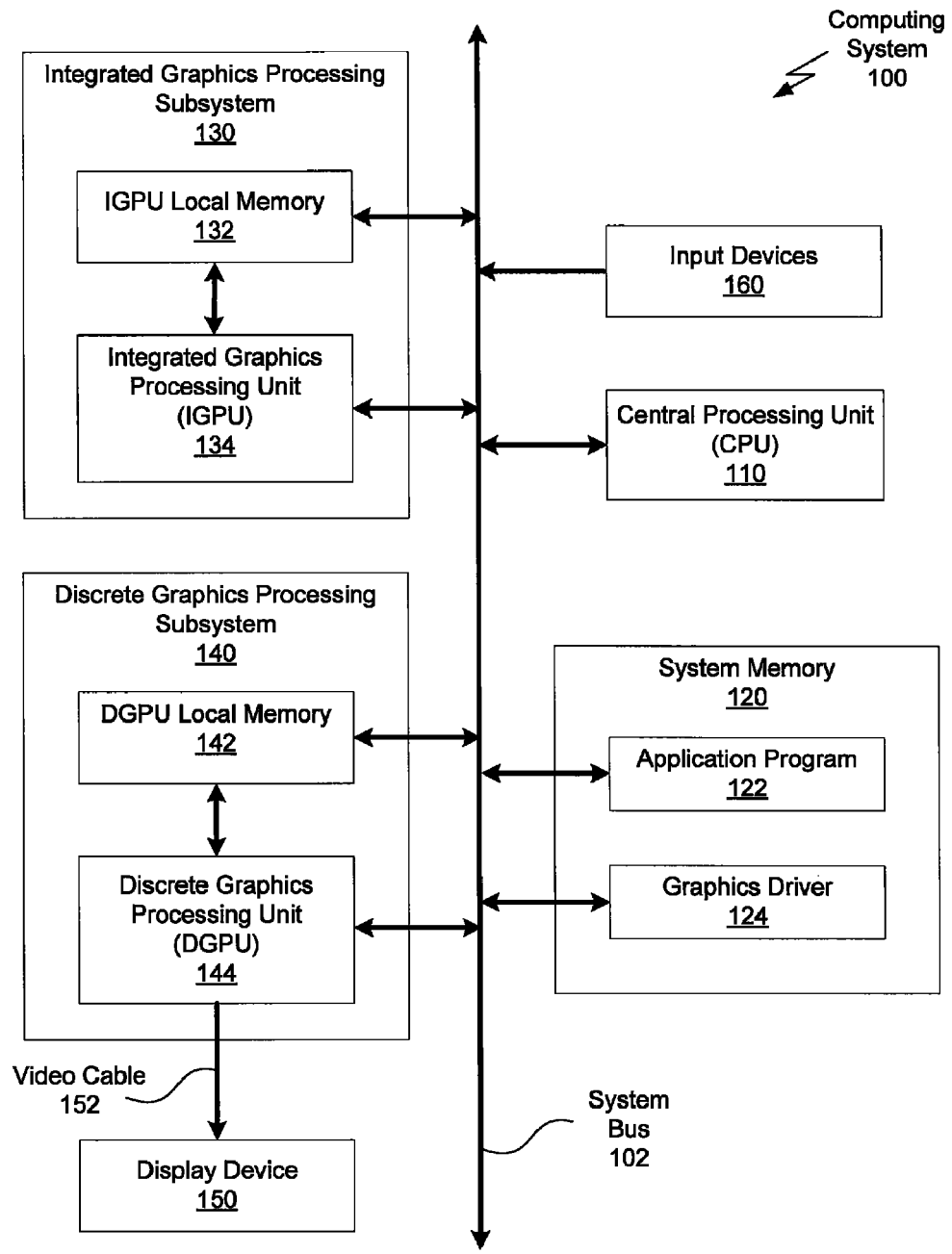
FIG. 1 is a conceptual diagram of a computing system in which one or more aspects of the invention may be implemented.

FIG. 1 is a conceptual diagram of a computing system 100 in which one or more aspects of the invention may be implemented. As shown, the computing system 100 includes a central processing unit (CPU) 110, input devices 160, a system memory 120, an integrated graphics processing subsystem 130, a discrete graphics processing subsystem 140, a video cable 152, and a display device 150. In alternate embodiments, the CPU 110 and portions of the integrated graphics processing subsystem 130 may be integrated into a single processing unit. Communication paths interconnecting the various components in FIG. 1 may be implemented using any suitable bus or point-to-point communication protocol(s), and connections between different devices may use different protocols as is known in the art.

The CPU 110 connects to the input devices 160, the system memory 120, the integrated graphics processing subsystem 130, and the discrete graphics processing subsystem 140 via a system bus 102. In alternate embodiments, the system memory 120 may connect directly to the CPU 110. The CPU 110 receives user input from the input devices 160, executes programming instructions stored in the system memory 120, operates on data stored in the system memory 120, and configures the integrated graphics processing subsystem 130 and the discrete graphics processing subsystem 140 to perform specific tasks in the graphics pipeline. Further, the CPU 110 may configure the integrated graphics processing subsystem 130 and the discrete graphics processing subsystem 140 to work together to perform specific tasks.

The system memory 120 typically includes dynamic random access memory (DRAM) used to store programming instructions and data for processing by the CPU 110, the integrated graphics processing subsystem 130, and the discrete graphics processing subsystem 140. The integrated graphics processing subsystem 130 and the discrete graphics processing subsystem 140 receive instructions that are transmitted by the CPU 110 and process the instructions in order to render graphics images. Subsequently, the discrete graphics processing subsystem 140 may transmit rendered graphics images through a video cable 152 to the display device 150. In alternate embodiments, there may be additional display devices connected to either the integrated graphics processing subsystem 130 or the discrete graphics processing subsystem 140.

The system memory 120 includes one or more application programs 122 and a graphics driver 124. The applications program 122 transmits instructions that are designed to operate within the integrated graphics processing subsystem 130 or the discrete graphics processing subsystem 140 to the graphics driver 124. The graphics driver 124 is configured to translate these instructions into machine code programs that execute on components within the integrated graphics processing subsystem 130 and the discrete graphics processing subsystem 140. The graphics driver 124 configures the integrated graphics processing subsystem 130 to run one image frame ahead of the discrete graphics processing subsystem 140. More specifically, the graphics driver 124 configures the integrated graphics processing subsystem 130 to pre-compute Z-values for each image frame and the discrete graphics processing subsystem 140 to render and display each image frame, using the pre-computed Z-values to expedite the rendering process.

The integrated graphics processing subsystem 130 includes an integrated graphics processing unit (IGPU) 134 and an IGPU local memory 132. In one embodiment, the IGPU 134 is part of the main chipset that is wired into the motherboard of the computing system 100. The IGPU 134 receives instructions transmitted from the graphics driver 124 and processes the instructions in order to pre-compute Z-values. The IGPU 134 stores data in the IGPU local memory 132 and transmit Z-values to the system memory 120 using a DMA engine (not shown). The IGPU 134 may be provided with any amount of IGPU local memory 132 and may use both the IGPU local memory 132 and the system memory 120. Further, in alternate embodiments, the IGPU local memory 132 may be incorporated into the system memory 120. The DMA engine may be implemented in any technically feasible fashion. For example, the DMA engine may be incorporated into the CPU 110 or may be part of the main chipset that is wired into the motherboard of the computing system 100.

The computing system 100 also includes the discrete graphics processing subsystem 140. The discrete graphics processing subsystem 140 includes a discrete graphics processing unit (DGPU) 144 and a DGPU local memory 142. The discrete graphics processing subsystem 140 may be part of a discrete graphics card that is connected to the motherboard of the computing system 100 via an expansion slot (e.g., PCI Express or Accelerated Graphics Port). The discrete graphics processing subsystem 140 typically has higher performance and a richer graphics feature set than the integrated graphics processing subsystem 130. The DGPU 144 receives instructions transmitted from the graphics driver 124, processes the instructions in order to render graphics images, and stores these images in the DGPU local memory 142. The DGPU 144 may be provided with any amount of DGPU local memory 142 and may use both the DGPU local memory 142 and the system memory 120. Further, the DGPU 144 displays certain graphics images on the display device 150 that is connected to the discrete graphics processing subsystem 140 via the video cables 152. The display device 150 is an output device capable of emitting a visual image corresponding to an input graphics image. For example, the display device 150 may be built using a cathode ray tube (CRT) monitor, a liquid crystal display (LCD), or any other suitable display system.

Figure 2:
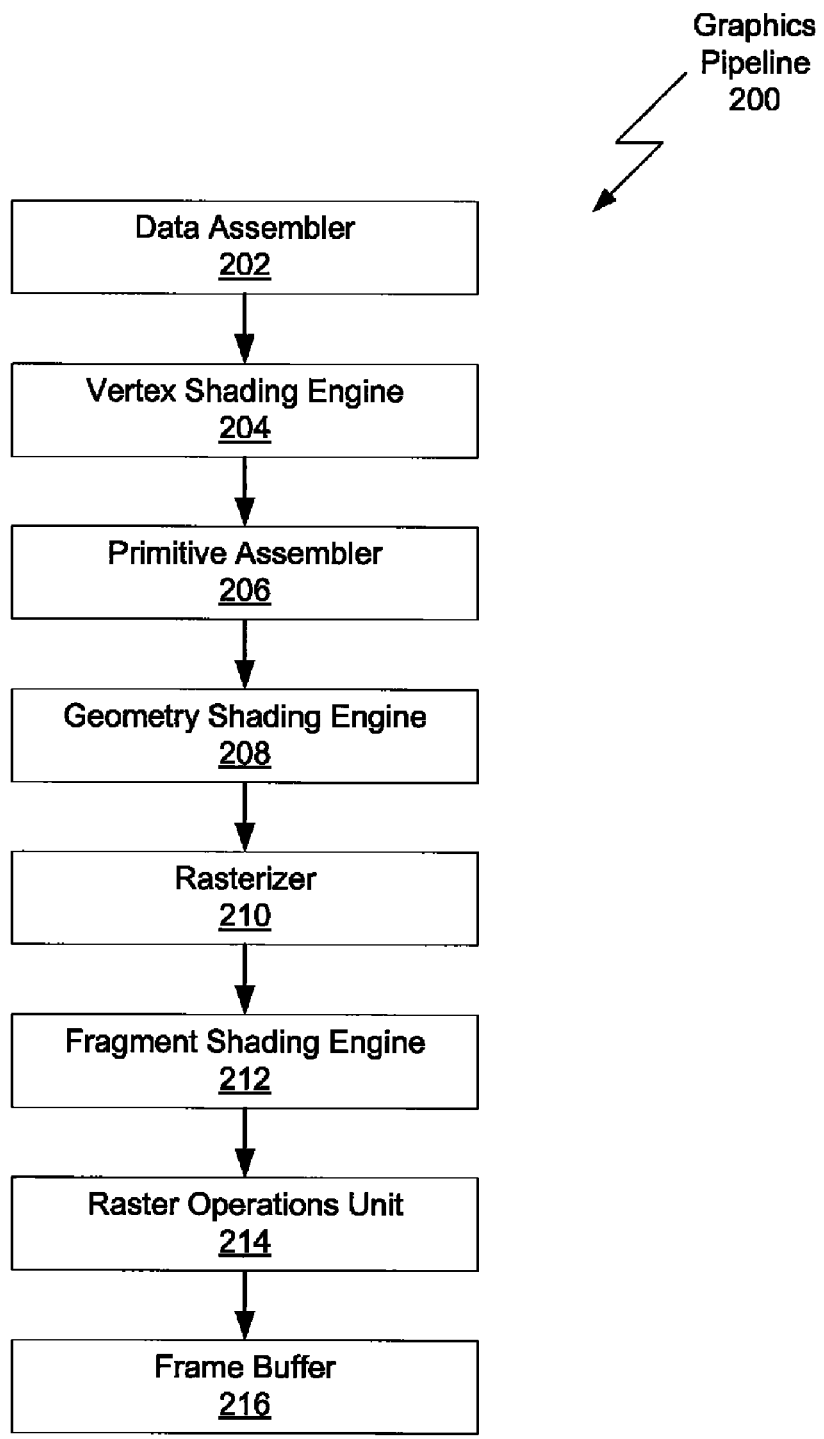
FIG. 2 is a conceptual diagram of a programmable graphics pipeline residing within each of the GPUs of FIG. 1, according to one embodiment of the invention.

FIG. 2 is a conceptual diagram of a programmable graphics pipeline 200 residing within the each of the GPUs 134 and 144 of FIG. 1, according to one embodiment of the invention. The graphics pipeline 200 is configured to transform 3-D images into 2-D images. As shown, the graphics pipeline 200 includes a data assembler 202, a vertex shading engine 204, a primitive assembler 206, a geometry shading engine 208, a rasterizer 210, a fragment shading engine 212, a raster operations unit 214, and a frame buffer 216.

The data assembler 202 is a fixed-function unit that collects vertex data from the application program 122 for high-order surfaces, primitives, and the like, and passes the vertex data to the vertex shading engine 204. The data assembler 202 may gather data from buffers stored within the system memory 120 and the associated local memory (i.e., the IGPU local memory 132 or the DGPU local memory 142) as well as from API calls from the application program 122 used to specify vertex attributes. The vertex shading engine 204 is a programmable execution unit that is configured to execute a machine code vertex shading program, processing vertex data as specified by the vertex shading program. For example, the vertex shading engine 204 may be programmed to transform the vertex data from an object-based coordinate representation (object space) to an alternatively based coordinate system such as world space or normalized device coordinates (NDC) space. The vertex shading engine 204 may access data that is stored in the associated local memory.

The primitive assembler 206 is a fixed-function unit that receives processed vertex data from the vertex shading engine 204 and constructs graphics primitives, e.g., points, lines, triangles, or the like, for processing by the geometry shading engine 208. In alternative embodiments, a second primitive assembler (not shown) may be included subsequent to the geometry shading engine 208 in the data flow through the GPU. The geometry shading engine 208 is a programmable execution unit that is configured to execute a machine code geometry shading program, processing graphics primitives received from the primitive assembler 206 as specified by the geometry shading program. For example, in addition to well-known per-primitive operations such as clipping, the geometry shading engine 208 may be programmed to generate one or more new graphics primitives and calculate parameters, such as plane equation coefficients, that are used to rasterize the new graphics primitives. The geometry shading engine 208 may access data that is stored in the associated local memory. The geometry shading engine 208 outputs the parameters and new graphics primitives to the rasterizer 210.

The rasterizer 210 is a fixed-function unit that scans the new graphics primitives and outputs fragments, each containing fragment data, which may include raster position, depth or interpolated vertex attributes, such as texture coordinates and opacity, to the fragment shading engine 212. The fragment shading engine 212 is a programmable execution unit that is configured to execute a machine code fragment shading program, processing fragments received from the rasterizer 210 as specified by the machine code fragment shading program. For example, the fragment shading engine 212 may be programmed to perform operations such as perspective correction, shading, blending, and the like, to produce shaded fragments that are output to the raster operations unit 214. Further, the fragment shading engine 212 may be programmed to iterate across groups of pixels. The fragment shading engine 212 may access data that is stored in buffers in the associated local memory. The raster operations unit 214 optionally performs fixed-function computations such as near and far plane clipping and raster operations, such as stencil, z test, blending and the like, and outputs pixel data as processed graphics data for storage in a buffer in the associated local memory, such as a frame buffer 216.

The frame buffer 216 stores data for at least one two-dimensional surface that may be used to drive the display device 150. Furthermore, the frame buffer 216 may include more than one two-dimensional surface so that the GPUs 134 and 144 can render to one two-dimensional surface while a second two-dimensional surface is used to drive the display device 150.

Figure 3:
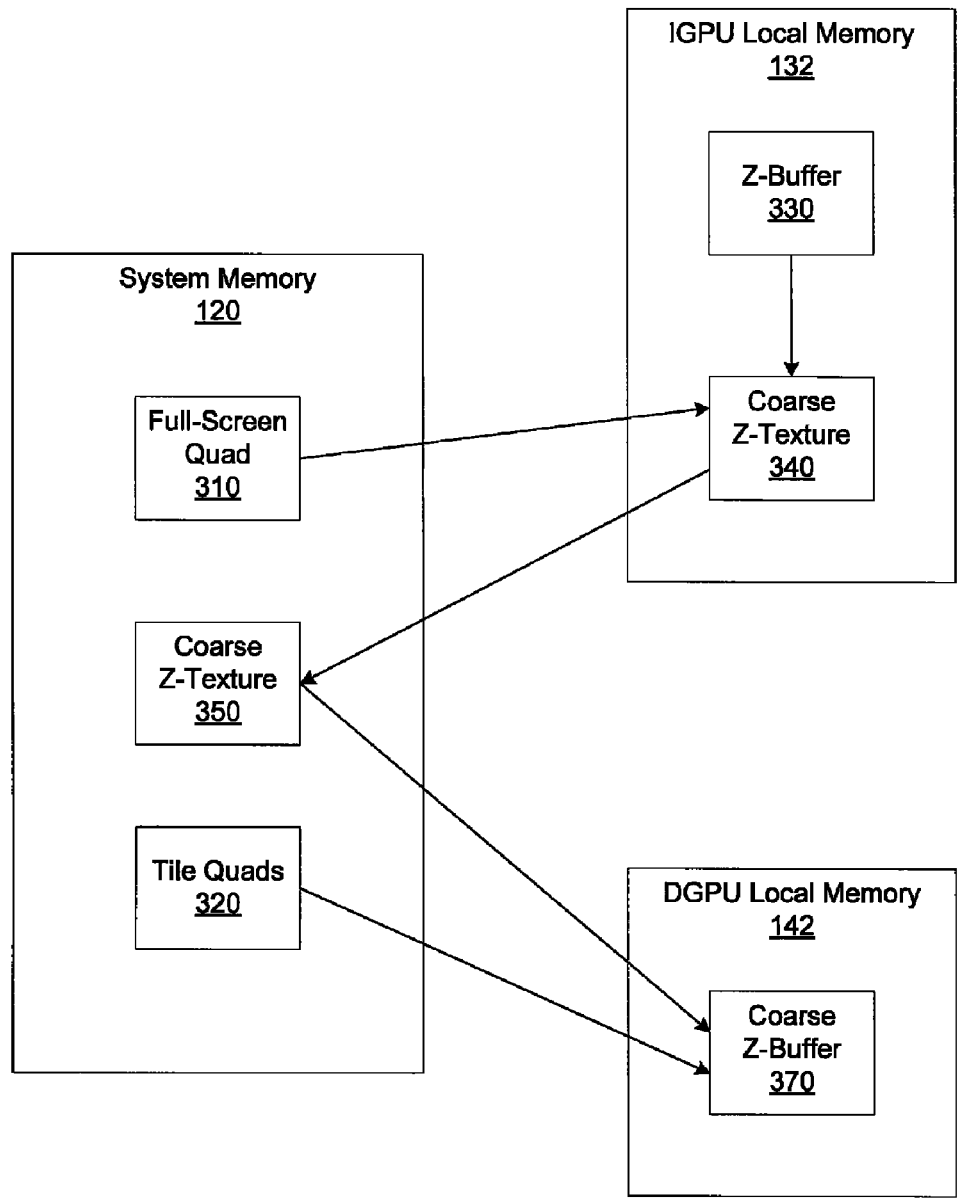
FIG. 3 is a conceptual diagram of the system memory, the IGPU local memory, and the DGPU local memory of the computing system of FIG. 1, according to one embodiment of the invention.

FIG. 3 is a conceptual diagram of the system memory 120, the IGPU local memory 132, and the DGPU local memory 142 of the computing system 100 of FIG. 1, according to one embodiment of the invention. Among other things, the graphics driver 124 uses the system memory 120 to store data used to configure the IGPU 134 and the DGPU 144. The IGPU 134 uses the IGPU local memory 132 and the system memory 120 while pre-computing Z-values for image frames. Similarly, the DGPU 144 uses the DGPU local memory 142 and the system memory 120 while rendering and displaying image frames on the display device 150.

Before configuring the IGPU 134 and the DGPU 144, the graphics driver 124 partitions the pixels included in the two-dimensional display surface of the display device 150 into contiguous, non-overlapping, M-by-N rectangular tiles of pixels. As set forth in greater detail herein, the resolution of the display surface and the tile size determine the number of Z-values that the DMA engine copies from the IGPU local memory 132 to the system memory 120. Further, the tile size may be chosen in any technically feasible fashion, considering factors such as the bandwidth of the system memory 120 and the performance of the DGPU 144.

To facilitate the rendering process, the graphics driver 124 generates a single full-screen quad 310 and a set of tile quads 320. The single full-screen quad 310 spans the entire two-dimensional display surface of the display device 150 and includes X and Y coordinates corresponding to the boundary of the display surface. However, the single full-screen quad 310 does not include any Z-values or color information. The graphics driver 124 stores the full-screen quad 310 in the system memory 120 and regenerates the full-screen quad 310 only when the size of the display surface changes. Similarly, for each tile in the display surface, the graphics driver 124 generates a corresponding tile quad 320 that includes X and Y coordinates that encompass the pixels included in the tile, but does not include any Z-values or color information. Together, these contiguous, non-overlapping tile quads 320 span the display surface. The graphics driver 124 stores the tile quads 320 in the system memory 120 and regenerates the tile quads 320 only when the size of the display surface, the resolution of the display surface, or the tile size changes.

Figure 4A:
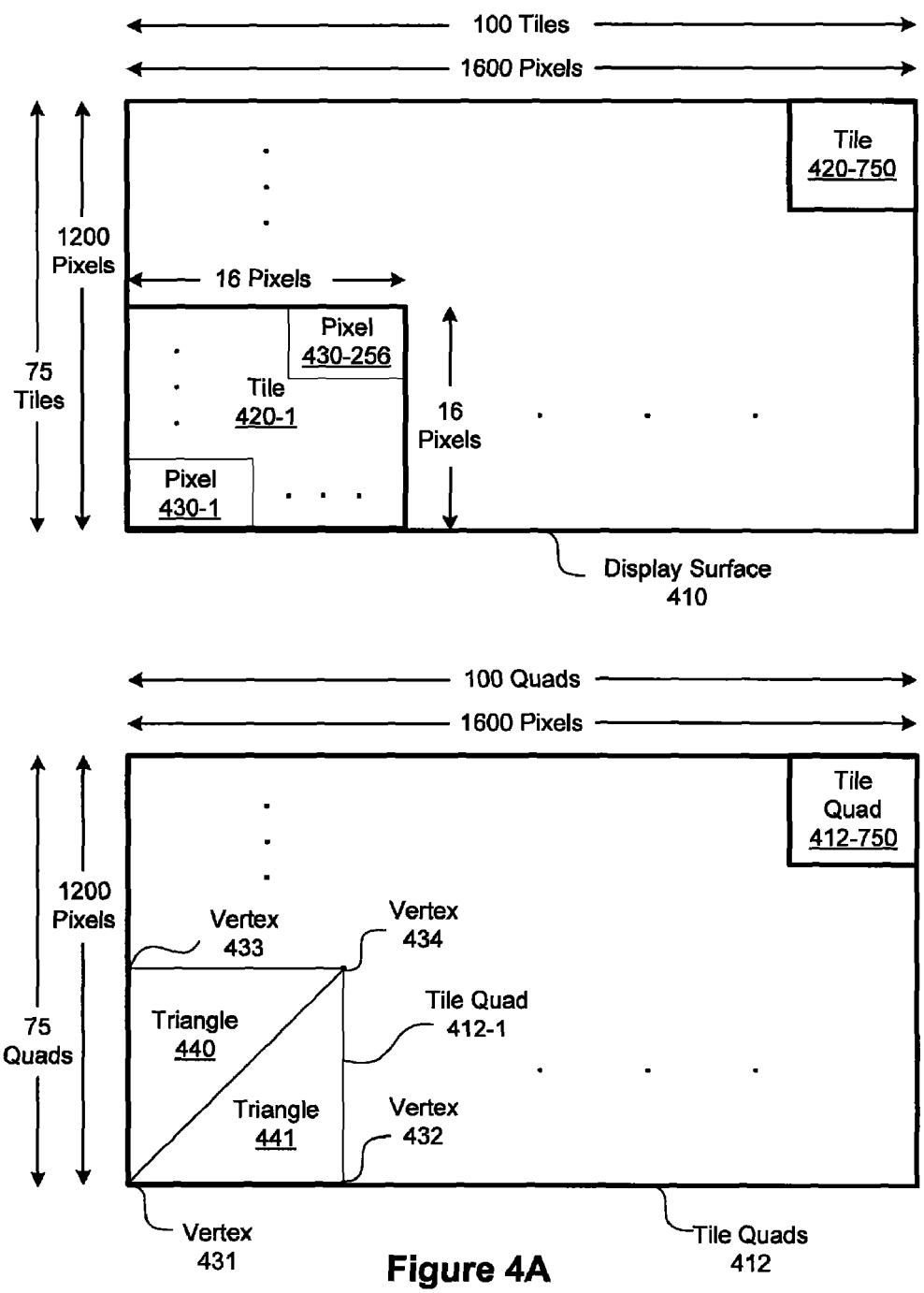
FIG. 4A is a conceptual diagram of an exemplary display surface and exemplary tile quads spanning the display surface, according to one embodiment of the invention.

FIG. 4A is a conceptual diagram of an exemplary display surface 410 and exemplary tile quads 412 spanning the display surface 410, according to one embodiment of the invention. The exemplary display surface 410 has a resolution of 1600-by-1200 pixels and is subdivided into tiles 420-1 through 420-750. Furthermore, the full-screen quad 310 that corresponds to the exemplary display surface 410 encompasses all of the pixels in the exemplary display surface 410 and, consequently, the tiles 420-1 through 420-750. As shown in detail for the tile 420-1, each of the tiles 420 includes 256 pixels 430, arranged in a sixteen-by-sixteen rectangle. Similarly, the display surface 410 is spanned by the tile quads 412-1 through 412-750. As shown in detail for the tile quad 412-1, each of the tile quads 412 includes two triangles, such as the triangle 440 and the triangle 441. Furthermore, each tile quad 412 includes four vertices (e.g., vertices 431, 432, 433, and 434) that define the boundaries of that particular tile quad 412. There is a one-to-one correspondence between the tiles 420 and the tile quads 412. In other words, for each of the tiles 420, there is a corresponding tile quad 412 that encompasses the pixels 430 that are included in that particular tile 420. In alternate embodiments, the display surface may have any resolution and the tile size may be chosen to be more or less than sixteen-by-sixteen.

Referring back now to FIG. 3, for each image frame, the graphics driver 124 configures the graphics pipeline 200 in the IGPU 134 to render only Z-values (ignoring all color information) for that image frame. While rendering, the IGPU 134 maintains the minimum Z-value, which corresponds to the closest depth of field value, for each pixel in the image frame in a Z-buffer 330. Ignoring the color information allows the IGPU 134 to efficiently pre-compute the Z-buffer 330 for the image frame. The IGPU 134 stores the Z-buffer 330 in the IGPU local memory 132. Since the Z-buffer 330 contains a Z-value for each pixel, the resolution of the Z-buffer 330 corresponds to the resolution of the display surface.

After the IGPU 134 has created the Z-buffer 330 corresponding to an image frame, the graphics driver 124 re-configures the graphics pipeline 200 in the IGPU 134 to down-sample the Z-buffer 330. The graphics driver 124 sets the render-target of the IGPU 134 to a coarse Z-texture 340 with a horizontal resolution that is a factor of M smaller than the resolution of the display surface and a vertical resolution that is a factor of N smaller than the vertical resolution of the display surface. Further, the graphics driver 124 configures the IGPU 134 to process the Z-buffer 330 as an input texture, such that the IGPU 134 processes each Z-value included in the Z-buffer 330 as if the Z-value were a color. The graphics driver 124 then configures the IGPU 134 to render the full-screen quad 310 onto the coarse Z-texture 340. Again, the X and Y coordinates of the four vertices of the full-screen quad 310 specify the boundary of the display surface.

While rendering, for each M-by-N group of pixels in a tile, the fragment shading engine 212 within the IGPU 134 scans the corresponding Z-values in the Z-buffer 330, determines the maximum of these Z-values, and writes the maximum Z-value to a texel in the coarse Z-texture 340. For example, if the tile size is sixteen-by-sixteen, then each texel in the coarse Z-texture 340 represents the maximum of 256 different Z-values in the Z-buffer 330. In this fashion, each texel in the coarse Z-texture 340 is assigned a Z-value for a particular tile in the display surface. The IGPU 134 maintains the coarse Z-texture 340 in the IGPU local memory 132. However, after the IGPU 134 has rendered the full-screen quad 310, the IGPU 134 uses the DMA engine to copy the coarse Z-texture 340 in the IGPU local memory 132 to the coarse Z-texture 350 in the system memory 120. Copying the pre-computed Z-values to the system memory 120 allows the DGPU 144 to access the pre-computed Z-values stored in the coarse Z-texture 350.

After the IGPU 134 has created the coarse Z-texture 350 corresponding to the image frame, the graphics driver 124 configures the graphics pipeline 200 in the DGPU 144 to construct a coarse Z-buffer 370 using the pre-computed Z-values in the coarse Z-texture 350. The graphics driver 124 sets the render-target of the DGPU 144 to a coarse Z-buffer 370 which has the same resolution as the display surface. Further, the graphics driver 124 configures the DGPU 144 to write only Z-values (i.e., not to execute any color writes) and to execute a "smart clear," thereby clearing any existing Z information that may be present in the coarse Z-buffer 370. As is known to persons skilled in the art, clearing the existing Z information enables the DGPU 144 to fully exploit existing Z-buffer compression techniques to generate and, subsequently, access the coarse Z-buffer 370. The graphics driver 124 then configures the DGPU 144 to render the tile quads 320, using the coarse Z-texture 350 to supply the Z-values for the tiles quads 320. For each tile quad 320, the vertex shading engine 204 within the DGPU 144 may use any technically feasible method to determine the location of the appropriate Z-value within the coarse Z-texture 350. Since the X and Y coordinates of each of the vertices of the tile quad 320 all map to the same texel in the coarse Z-texture 350, the X and Y coordinates of any of the four vertices may be used to determine the location of the appropriate Z-value. For example, the vertex shading engine 204 may use the X and Y coordinates of the first vertex of the tile quad 320 to determine the location of the appropriate Z-value within the coarse Z-texture 350. Subsequently, the vertex shading engine 204 uses this location to fetch the appropriate pre-computed Z-value from the coarse Z-texture 350. Again, there is a one-to-one correspondence between the M-by-N tiles of pixels, the tile quads 320, and the texels in the coarse Z-texture 350. For example, if a display surface has a resolution of 1600-by-1200 pixels and the tile size is sixteen-by-sixteen, then the graphics driver 124 partitions the display surface into 750 tiles, the graphics driver 124 generates 750 tile quads 320, and the coarse Z-texture 350 contains 750 texels.

For each tile quad 320, as the DGPU 144 renders the particular tile quad 320 to the coarse Z-buffer 370, the vertex shading engine 204 within the DGPU 144 applies the pre-computed Z-value that the DGPU 144 fetched from the coarse Z-texture 350 to each of the four vertices of the tile quad 320. Subsequently, the rasterizer 210 within the DGPU 144 converts the tile quad 320 into an M-by-N tile of pixels, assigning the Z-value associated with the tile quad 320 to each of the M-by-N pixels. Since the DGPU 144 maintains the Z-value for each of the pixels in the coarse Z-buffer 370, rendering the tile quads 320 in this fashion enables the DGPU 144 to create the coarse Z-buffer 370 using the pre-computed Z-values in the coarse Z-texture 350. Again, the X and Y coordinates of the four vertices of each tile quad 320 specify the boundary of a corresponding tile of pixels in the coarse Z-buffer 370. Advantageously, since the DGPU 144 creates the coarse Z-buffer 370, the coarse Z-buffer 370 may be built fully-compressed.

Subsequently, the graphics driver 124 re-configures the graphics pipeline 200 within the DGPU 144 to render the image frame with full shading (including color information). The DGPU 144 uses the coarse Z-buffer 370 to advantageously avoid rendering certain pixel fragments in the image that would otherwise be occluded by closer geometries in the image being rendered.

Figure 4B:
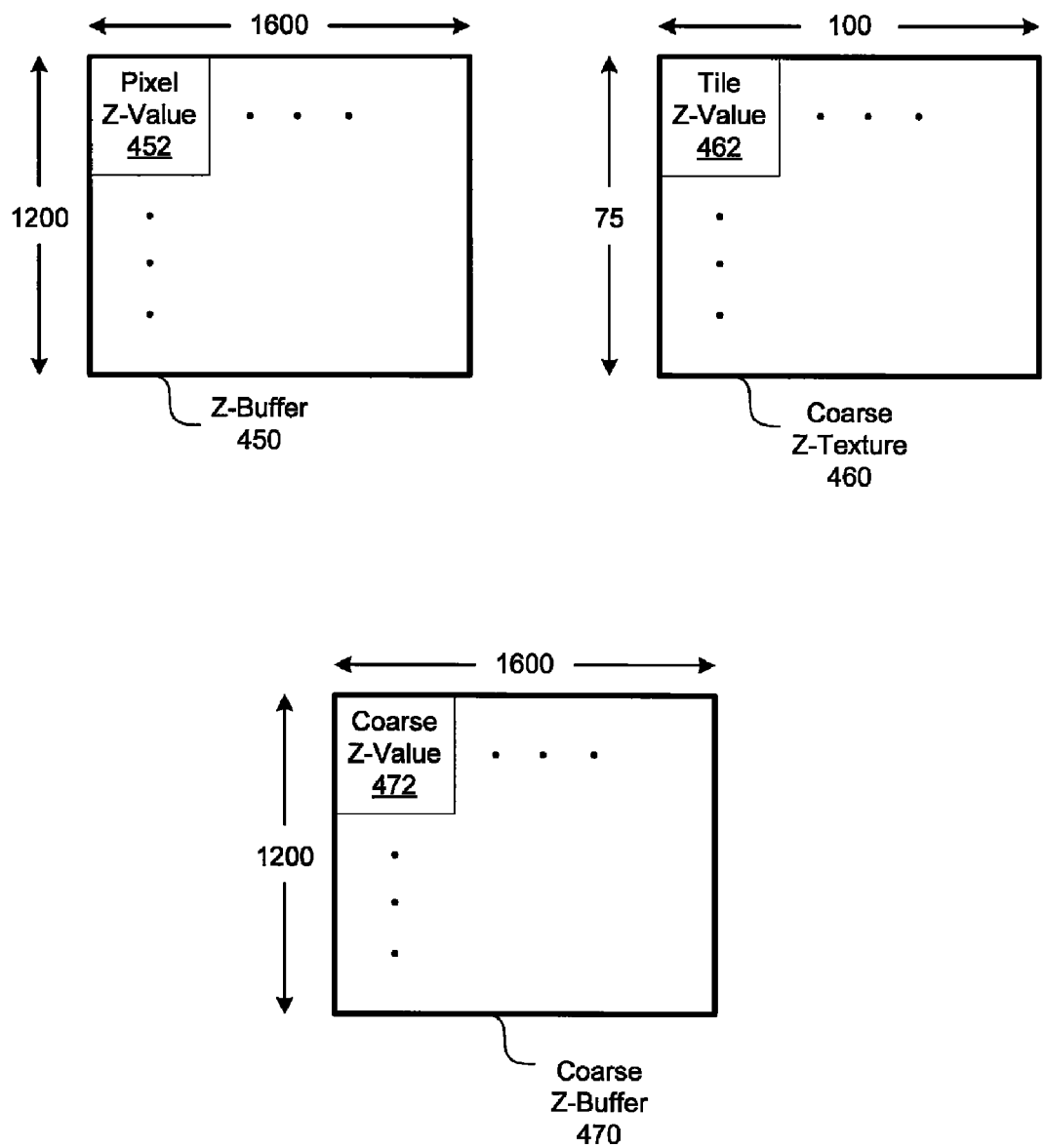
FIG. 4B is a conceptual diagram of an exemplary Z-buffer, a corresponding coarse Z-texture, and a corresponding coarse Z-buffer, according to one embodiment of the invention.

FIG. 4B is a conceptual diagram of an exemplary Z-buffer 450, a corresponding coarse Z-texture 460, and a corresponding coarse Z-buffer 470, according to one embodiment of the invention. The Z-buffer 450 is a specific example of the Z-buffer 330 of FIG. 3, the coarse Z-texture 460 is a specific example of the coarse Z-texture 340, and the coarse Z-buffer 470 is a specific example of the coarse Z-buffer 370. Again, the graphics driver 124 partitions the display surface 410 of FIG. 4A into the set of tiles 420, creates the full-screen quad 310 that corresponds to the display surface 410, and creates the set of tile quads 412 that correspond to the set of tiles 420. Subsequently, for each image frame, the graphics driver 124 configures the IGPU 134 to create the Z-buffer 450 by Z-rendering the image frame, down-sample the Z-buffer 450 to create the coarse Z-texture 460 by rendering the full-screen quad 310, and copy the coarse Z-texture 460 from the IGPU local memory 132 to the system memory 120. Finally, for each image frame, the graphics driver 124 configures the DGPU 144 to create the coarse Z-buffer 470 by rendering the tile quads 412 using data from the copy of the coarse Z-texture 460 in the system memory 120, and render the image using the coarse Z-buffer 470.

As shown, the Z-buffer 450 includes a pixel Z-value 452 for each pixel in the display surface 410. Consequently, the Z-buffer 450 includes 1920000 pixel Z-values 452 arranged in a 1600-by-1200 rectangular array. The coarse Z-texture 460 includes a tile Z-value 462 for each tile 420 in the display surface 410. Consequently, the coarse Z-texture 460 includes 750 tile Z-values 462 arranged in a 100-by-75 rectangular array. Further, as previously described herein, each tile Z-value 462 represents the maximum of the 256 corresponding pixel Z-values 452 in the Z-buffer 450. The coarse Z-buffer 470 includes a coarse Z-value 472 for each pixel in the display surface. Consequently, the coarse Z-buffer 470 includes 1920000 coarse Z-values 472 arranged in a 1600-by-1200 rectangular array. However, each of the 256 coarse Z-values 472 that correspond to a given tile has the same entry—the tile Z-value 462 for that particular tile.

Again, in alternate embodiments, the display surface may have any resolution and the tile size may be chose to be more or less than sixteen-by-sixteen. Therefore, the resolution and composition of the Z-buffer, the coarse Z-texture, and the coarse Z-buffer may vary.

Figure 5:
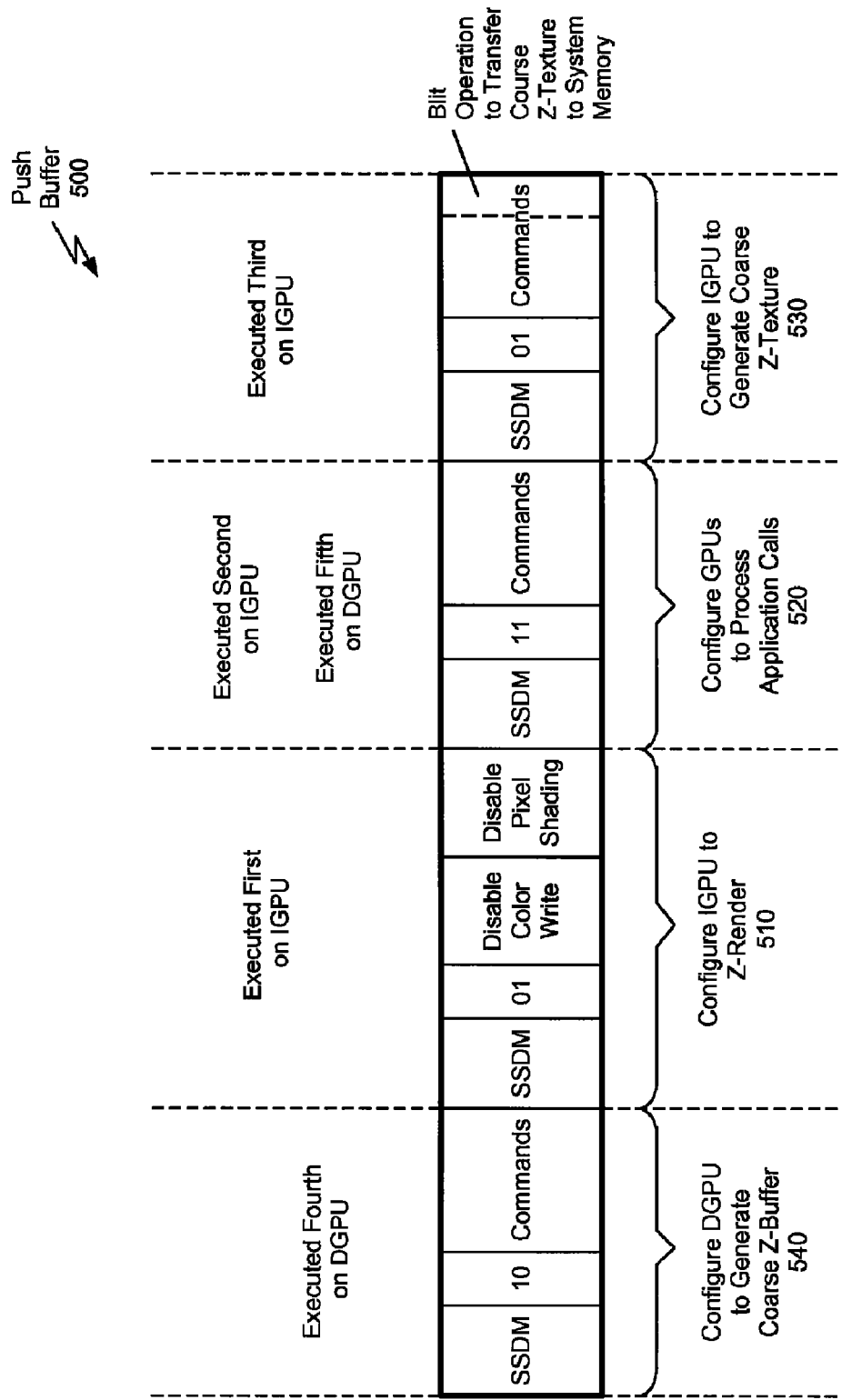
FIG. 5 is a conceptual diagram of an exemplary push buffer, according to one embodiment of the invention.

FIG. 5 is a conceptual diagram of an exemplary push buffer 500, according to one embodiment of the invention. For each image frame, the graphics driver 124 may generate a single push buffer, such as the push buffer 500. The push buffer 500 includes a stream of commands designed to configure the IGPU 134 and the DGPU 144 to work together to implement the graphics calls from the application programs 122 to render and display a particular image frame. First, the graphics driver 124 configures the IGPU 134 to process the push buffer 500. After the IGPU 134 has finished processing the push buffer 500, the graphics driver 124 configures the DGPU 144 to process the push buffer 500. Consequently, the IGPU 134 runs one image frame ahead of the DGPU 144. Furthermore, some of the commands in the push buffer 500 target both the IGPU 134 and the DGPU 144, while other commands target only one of the GPUs.

As shown, the push buffer 500 includes four sets of command. A set of commands 540 configures the DGPU 144 to generate the coarse Z-buffer 370. A set of commands 510 configures the IGPU 134 to Z-render (i.e., render Z-values to the Z-buffer 330, but ignore all color information). A set of commands 520 configures both the IGPU 134 and the DGPU 144 to process application calls. And a set of commands 530 configures the IGPU 134 to generate the coarse Z-texture 350.

Each set of commands begins with a "set device sub-mask" (SSDM) command and a mask that selects one or both of the GPUs 134 and 144 to execute the subsequent commands in the set of commands. For example, the set of commands 540 configures the DGPU 144 to generate a coarse Z-buffer 370. Therefore, the set of commands 540 begins with a "set device sub-mask" (SSDM) command and a mask (i.e., 01), which configure the IGPU 134 to ignore the remainder of the set of commands 540 and the DGPU 144 to execute the remainder of the set of commands 540. Similarly, the set of commands 520 configures both the IGPU 134 and the DGPU 144 to process application calls. Therefore, the set of commands 520 begins with a SSDM command and a mask (i.e., 11), which configure both the IGPU 134 and the DGPU 144 to execute the remainder of the set of commands 520.

When the IGPU 134 has finished processing the push buffer corresponding to a given image frame, the IGPU 134 begins processing the commands in the push buffer 500, which relates to the next image frame. First, the IGPU 134 executes the set of commands 510 that configure the IGPU 134 to Z-render by disabling both color writes and pixel shading. Subsequently, the IGPU 134 executes the set of commands 520 that configures the IGPU 134 to execute graphics commands corresponding to the calls from the application programs 122 for the particular image frame. While Z-rendering the image frame, the IGPU 134 generates the Z-buffer 330. After Z-rendering the image frame, the IGPU 134 executes the set of commands 530 that configure the IGPU 134 to generate the coarse Z-texture 340 from the Z-buffer 330 and to copy the coarse Z-texture 340 from the IGPU local memory 132 to the coarse Z-texture 350 in the system memory 120.

After the IGPU 134 finishes processing the commands in the push buffer 500, the DGPU 144 processes the commands in the push buffer 500 for the next image frame. First, the DPGU 144 executes the set of commands 540 that configure the DGPU 144 to generate the coarse Z-buffer 370. Subsequently, the DGPU 144 executes the set of commands 520 that configure the DGPU 144 to execute graphics commands corresponding to the calls from the application program 122 for the particular image frame. While fully rendering the image frame, the DGPU 144 uses the coarse Z-buffer 370 to avoid rendering certain pixel fragments in the image that would otherwise be occluded by closer geometries in the image being rendered.

In alternate embodiments, the graphics driver may configure the IGPU using one push buffer and the DGPU using another push buffer. In other embodiments, the graphics driver may communicate with the IGPU and the DGPU in any technically feasible manner, such as inserting different commands into the push buffer or employing a communication technique other than a push buffer.

Figure 6:
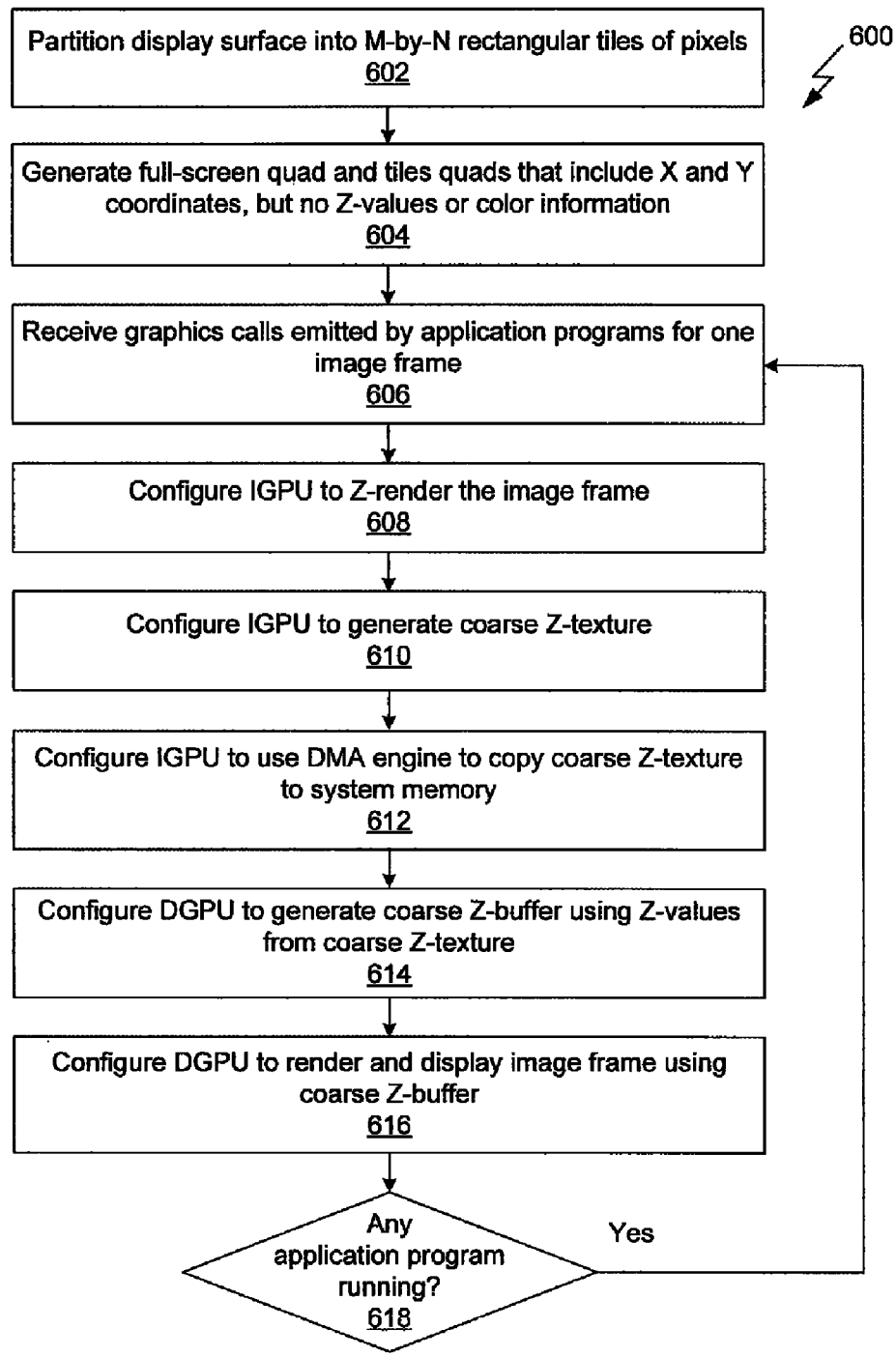
FIG. 6 is a flow diagram of method step for pre-computing and transferring Z-values between GPUs for an image frame, according to one embodiment of the invention.

FIG. 6 is a flow diagram of method step for pre-computing and transferring Z-values between GPUs for an image frame, according to one embodiment of the invention. Although the method steps are described in conjunction with the systems for FIGS. 1-3, persons skilled in the art will understand that any system that performs the method steps, in any order, is within the scope of the invention.

As shown, the method 600 begins at step 602, where the graphics driver 124 partitions the display surface into contiguous, non-overlapping M-by-N rectangular tiles of pixels. At step 604, the graphics driver 124 generates a single full-screen quad 310 and a set of tile quads 320. The full-screen quad 310 includes X and Y coordinates that correspond to the boundaries of the display surface, but does not include any Z-value or color information. Each of the tile quads 320 includes X and Y coordinates that encompass the pixels included in one of the M-by N tiles defined in step 602. The tile quads 320 do not include any Z-value or color information either. At step 606, the graphics driver 124 receives graphics calls emitted by the application programs 122 for one image frame. At step 608, the graphics driver 124 configures the IGPU 134 to Z-render (i.e., render Z-values to the Z-buffer 330, but ignore all color information) the image frame. At step 610, the graphics driver 124 configures the IGPU 134 to generate the coarse Z-texture 340 in the IGPU local memory 132 by down-sampling the Z-buffer 330. A series of method steps for configuring the IGPU 134 to pre-compute the coarse Z-texture 340 is described in greater detail below in FIG. 7. At step 612, the graphics driver 124 configures the IGPU 134 to use a DMA engine to copy the coarse Z-texture 340 in the IGPU local memory 132 to the coarse Z-texture 350 in the system memory 120. Advantageously, the coarse Z-texture 340 is a factor of M-by-N smaller than the corresponding Z-buffer 330. Therefore, copying the coarse Z-texture 340 uses less system memory bandwidth than copying the entire Z-buffer 330, as is done in prior-art approaches.

At step 614, the graphics driver 124 configures the DGPU 144 to generate a coarse Z-buffer 370 by applying the Z-values in the pre-computed coarse Z-texture 350 to the tile quads 320. A series of method steps for configuring the DGPU 144 to generate a coarse Z-buffer 370 is described in greater detail below in FIG. 8. Again, since the DGPU 144 generates the coarse Z-buffer 370 instead of using a DMA engine to fetch a Z-buffer, the DGPU 144 may use any existing Z-buffer compression techniques to both build and access the coarse Z-buffer 370. At step 616, the graphics driver 124 configures the DGPU 144 to fully render and display the image frame, using the coarse Z-buffer 370 to avoid rendering certain pixel fragments in the image that would otherwise be occluded by closer geometries in the image being rendered. At step 618, if any application program 122 is running, then the method 600 returns to step 606 where the graphics driver 124 receives graphics calls emitted by the application programs 122 for the next image frame. The method 600 continues to execute steps 606 through 618, configuring the IGPU 134 and the DGPU 144 to work together to render and display each image frame, until no application programs 122 are running or until the computing system 100 is re-configured (e.g., the display device 150 is changed or the display resolution is changed).

Figure 7:
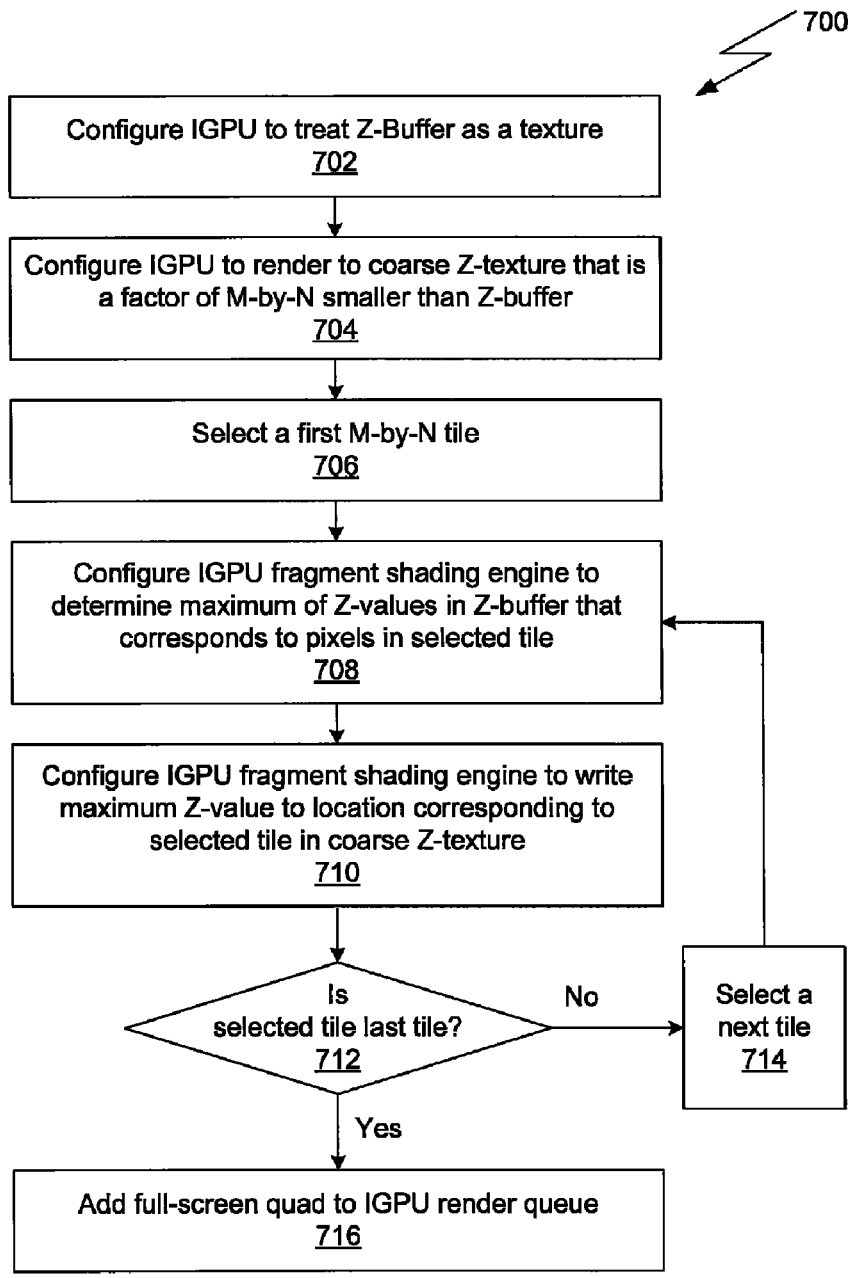
FIG. 7 is a flow diagram of method steps for configuring the IGPU to pre-compute a coarse Z-texture, according to one embodiment of the invention.

FIG. 7 is a flow diagram of method steps for configuring the IGPU 134 to pre-compute a coarse Z-texture, according to one embodiment of the invention. Although the method steps are described in conjunction with the systems for FIGS. 1-3, persons skilled in the art will understand that any system that performs the method steps, in any order, is within the scope of the invention.

As shown, the method 700 begins at step 702, where the graphics driver 124 configures the IGPU 134 to treat the Z-buffer 330 as a texture. At step 704, the graphics driver 124 configures the IGPU 134 to render to the coarse Z-texture 340. As previously described herein, the coarse Z-texture 340 is a factor of M-by-N smaller than the Z-buffer 330. Furthermore, the dimensions M-by-N correspond to a tile size chosen by the graphics driver 124 before the graphics driver 124 configures the IGPU 134. At step 706, the graphics driver 124 selects a first M-by-N tile in the display surface. At step 708, the graphics driver 124 configures the fragment shading engine 212 within the IGPU 134 to determine the maximum of the Z-values in the Z-buffer 330 that correspond to the pixels in the selected tile. At step 710, the graphics driver 124 configures the fragment shading engine 212 within the IGPU 134 to write the maximum Z-value to the location corresponding to the selected tile in the coarse Z-texture 340. At step 712, if the graphics driver 124 determines that the selected tile is not the last tile in the display surface, then the method 700 proceeds to step 714. At step 714, the graphics driver 124 selects a next tile in the display surface, and the method 700 returns to step 708.

The method 700 continues to execute steps 708 through 714, configuring the fragment shading engine 212 within the IGPU 134 to iterate over each M-by-N tile of pixels in the display surface, until the fragment shading engine 212 has been configured to iterate over all of the pixels in the display surface. If, at step 712, the graphics driver 124 determines that the selected tile is the last tile in the display surface, then the method 700 proceeds to step 716. At step 716, the graphics driver 124 adds the full-screen quad 310 to the render queue of the IGPU 134. Subsequently, while rendering the full-screen quad 310, the IGPU 134, as configured in steps 702-712, down-samples the Z-buffer 330 to generate the coarse Z-texture 340.

Figure 8:
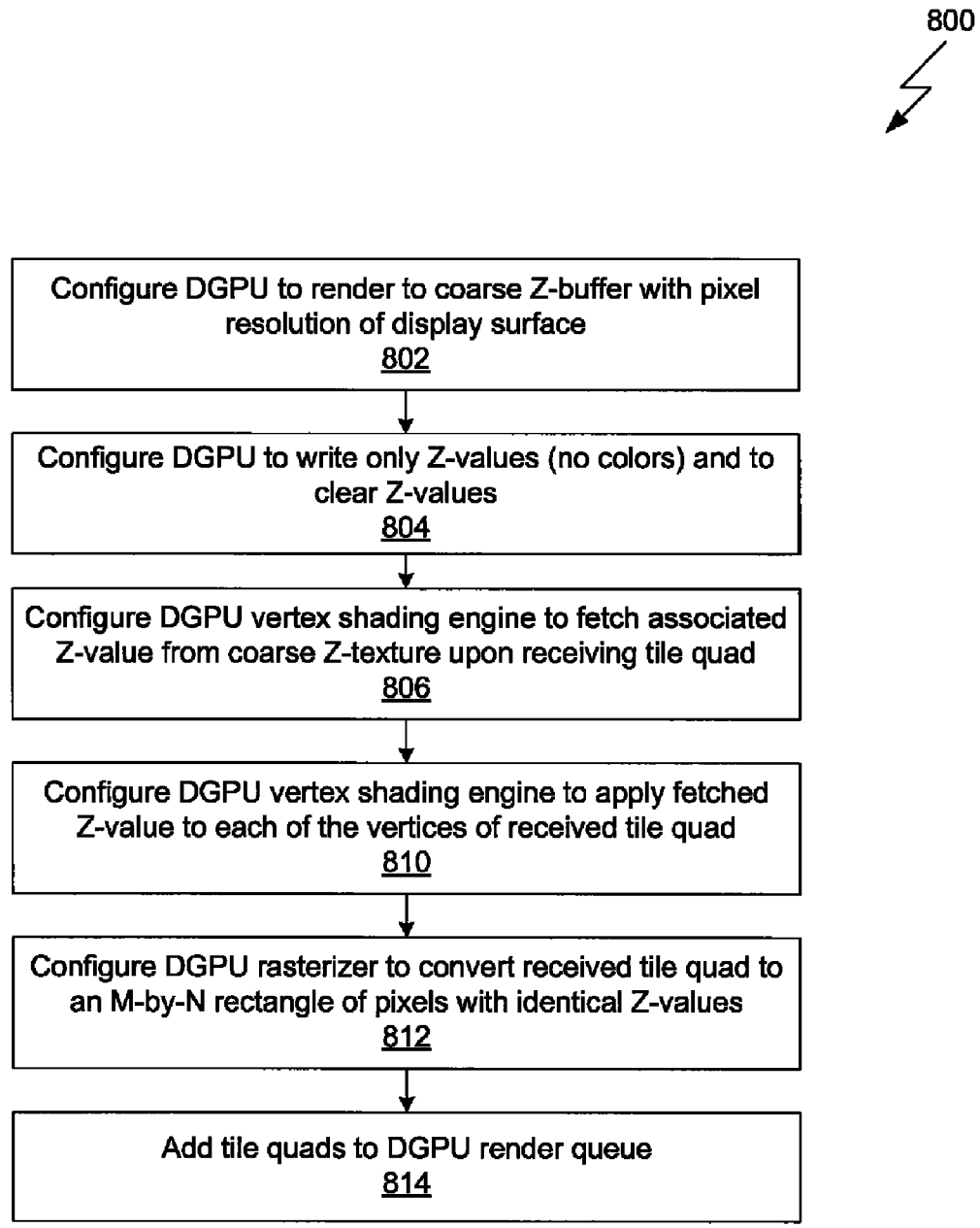
FIG. 8 is a flow diagram of method steps for configuring the DGPU to generate a coarse Z-buffer, according to one embodiment of the invention.

FIG. 8 is a flow diagram of method steps for configuring the DGPU 144 to generate a coarse Z-buffer 370, according to one embodiment of the invention. Although the method steps are described in conjunction with the systems for FIGS. 1-3, persons skilled in the art will understand that any system that performs the method steps, in any order, is within the scope of the invention.

As shown, the method 800 begins at step 802, where the graphics driver 124 configures the DGPU 144 to render to the coarse Z-buffer 370. Again, the coarse Z-buffer 370 has the same resolution as the display surface. At step 804, the graphics driver 124 configures the DGPU 144 to write only Z-values (no colors) and to clear any current Z-values in the coarse Z-buffer 370. As is known to persons skilled in the art, clearing the Z-values in this fashion enables the DGPU 144 to employ any existing Z-buffer compression techniques while building and accessing the coarse Z-buffer 370. At step 806, the graphics driver 124 configures the vertex shading engine 204 within the DGPU 144 to, upon receiving a tile quad 320, fetch the Z-value associated with the tile quad 320 from the coarse Z-texture 350. The vertex shading engine 204 may use any technically feasible method to determine the location of the appropriate Z-value within the coarse Z-texture 350. For example, the vertex shading engine 204 may use the X and Y coordinates of the first vertex included in the received tile quad 320 to determine the location of the appropriate Z-value within the coarse Z-texture 350. At step 810, the graphics driver 124 configures the vertex shading engine 204 within the DGPU 144 to apply the fetched Z-value to each of the four vertices of the received tile quad 320. At step 812, the graphics driver 124 configures the rasterizer 210 within the DGPU 144 to convert the received tile quad 320 to an M-by-N tile of pixels, assigning the fetched Z-value to each of the M-by-N pixels within the M-by-N tile. As part of step 812, since the DGPU 144 is configured to maintain the Z-values for each of the pixels in the coarse Z-buffer 370, the DGPU 144 is able to copy the fetched Z-value to the locations in the coarse Z-buffer 370 that represents each of the M-by-N pixels encompassed by the received tile quad 320. At step 814, the graphics driver 124 adds each of the tile quads 320 to the render queue of the DGPU 144. Subsequently, while rendering the tile quads 320, the DGPU 144, as configured in steps 802 through 812, creates the coarse Z-buffer 370 using the pre-computed Z-values in the coarse Z-texture 350.

As disclosed previously herein, the graphics driver 124 may configure the IGPU 134 and the DGPU 144 to perform portions of the methods of FIGS. 6-8 using a push buffer, which enables the graphics driver 124 to buffer one or more image frames. Buffering the image frames allows the CPU 110 to work independently of the IGPU 134 and the DGPU 144, thereby further optimizing the overall system performance.

In sum, a graphics driver may be configured to efficiently transfer pre-computed Z-values between GPUs by using a coarse Z-texture. In one embodiment, the graphics driver partitions the display surface into contiguous, non-overlapping M-by-N rectangular tiles. For each tile, the graphics driver then generates a quad geometry that includes X and Y coordinates that encompass the pixels included in the tile, but no Z-values or color information. For each image frame, the graphics driver configures the IGPU to render the minimum Z-value (corresponding to the closest depth of field) for each pixel to a Z-buffer, ignoring all color information. Subsequently, the graphics driver configures the IGPU to process the Z-buffer as a texture, using the fragment shading engine to compute the maximum Z-value for each M-by-N tile of pixels and rendering the maximum Z-value to a coarse Z-texture. Consequently, the coarse Z-texture has a horizontal resolution that a factor of M smaller than the horizontal resolution of the Z-buffer and a vertical resolution that is a factor of N smaller than the vertical resolution of the Z-buffer. The IGPU then uses a DMA engine to copy the coarse Z-texture from the IGPU local memory to the system memory.

For each image frame, the graphics driver configures the DGPU to render the tile quads spanning the display surface, using the DGPU vertex shading engine to fetch and apply the appropriate Z-values from the coarse Z-texture in system memory. The graphics driver configures the DGPU rasterizer to convert each tile quad into an M-by-N tile of pixels, the Z-value of each pixel determined by the Z-value of the encompassing tile quad and stored in a coarse Z-buffer. Finally, the graphics driver configures the DGPU to fully render the image frame, using the coarse Z-buffer to avoid rendering certain pixel fragments in the image that would otherwise be occluded by closer geometries in the image being rendered.

Advantageously, the total size of the pre-computed Z-values that the DMA engine copies from the IGPU local memory to the system memory is typically smaller than the corresponding Z-buffer. For example, if the tile size is chosen to be sixteen-by-sixteen, then the total number of Z-values that the DMA engine copies from the IGPU local memory to the system memory is a factor of 256 smaller than the number of Z-values contained in the corresponding Z-buffer. Consequently, the likelihood of straining the system memory bandwidth may be substantially reduced compared to prior-art approaches, where the DMA engine copies the entire Z-buffer from the IGPU local memory to the system memory and then to the DGPU local memory. Furthermore, since only the DGPU interfaces with the coarse Z-buffer, using the disclosed technique for transferring pre-computed Z-values enables the DGPU to fully exploit existing Z-buffer compression techniques to generate and process the coarse Z-buffer. Finally, in many existing systems, the disclosed technique requires no hardware modifications.

While the foregoing is directed to embodiments of the present invention, other and further embodiments of the invention may be devised without departing from the basic scope thereof, and the scope thereof is determined by the claims.

I claim:

1. A method for transferring pre-computed z-values between graphics processing units (GPUs), the method comprising:
    partitioning a display surface into a set of tiles, wherein each tile includes a plurality of pixels;
    generating a full-screen quad having x and y coordinates corresponding to a boundary of the display surface;
    configuring a first GPU to render an image frame by writing a minimum z-value into a z-buffer for each pixel associated with the display surface;
    configuring the first GPU to generate a coarse z-texture based on the full-screen quad and the minimum z-values written to the z-buffer;
    configuring the first GPU to write the coarse z-texture to a system memory, wherein the coarse z-texture corresponds to the image frame;
    configuring a second GPU to generate a coarse z-buffer based on the minimum z-values included in the coarse z-texture from the system memory; and
    configuring the second GPU to render the image frame with full shading based on the coarse z-buffer.

2. The method of claim 1, wherein the first GPU comprises a GPU integrated within the hardware of a computing device.

3. The method of claim 1, wherein, to generate the coarse z-texture, the first GPU is configured to write one z-value to the coarse z-texture for each tile in the set of tiles.

4. The method of claim 3, wherein the one z-value is the maximum minimum z-value associated with the tile.

5. The method of claim 3, wherein the x and y coordinates of the full-screen quad delineate one or more boundaries of the coarse z-texture.

6. The method of claim 5, further comprising the step of generating a set of tile quads, wherein each tile quad is associated with a different tile in the set of tiles and has x and y coordinates corresponding to a boundary of the associated tile.

7. The method of claim 6, wherein configuring the second GPU to generate the coarse z-buffer further comprises using the set of tile quads.

8. The method of claim 7, wherein, to generate the coarse z-buffer, the second GPU is configured to fetch a pre-computed z-value from the coarse z-texture corresponding to the tile associated with each one of the tile quads.

9. The method of claim 8, wherein, to generate the coarse z-buffer, the second GPU is configured to write to the coarse z-buffer the z-value from the coarse z-texture for each pixel in the plurality of pixels included in the associated tile.

10. The method of claim 7, wherein the second GPU comprises a GPU that can be coupled to the hardware of a computing device.

11. A non-transitory computer-readable medium including instructions that, when executed by a processing unit, cause the processing unit to transfer pre-computed z-values between graphics processing units (GPUs), by performing the steps of:
    partitioning a display surface into a set of tiles, wherein each tile includes a plurality of pixels;
    generating a full-screen quad having x and y coordinates corresponding to a boundary of the display surface;
    configuring a first GPU to render an image frame, wherein the first GPU writes a minimum z-value to a z-buffer for each pixel associated with the display surface;
    configuring the first GPU to generate a coarse z-texture based on the full-screen quad and the minimum z-values written to the z-buffer;
    configuring the first GPU to write the coarse z-texture to a system memory;
    configuring a second GPU to generate a coarse z-buffer based on the minimum z-values included in the coarse z-texture from the system memory; and
    configuring the second GPU to render the image frame with full shading based on the coarse z-buffer.

12. The non-transitory computer-readable medium of claim 11, wherein, to generate the coarse z-texture, the first GPU is configured to write one z-value to the coarse z-texture for each tile in the set of tiles.

13. The non-transitory computer-readable medium of claim 12, wherein the one z-value is the maximum minimum z-value associated with the tile.

14. The non-transitory computer-readable medium of claim 12, wherein the x and y coordinates of the full-screen quad delineate one or more boundaries of the coarse z-texture.

15. The non-transitory computer-readable medium of claim 14, further comprising the step of generating a set of tile quads, wherein each tile quad is associated with a different tile in the set of tiles and has x and y coordinates corresponding to a boundary of the associated tile.

16. The non-transitory computer-readable medium of claim 15, wherein configuring the second GPU to generate the coarse z-buffer further comprises using the set of tile quads.

17. The non-transitory computer-readable medium of claim 16, wherein, to generate the coarse z-buffer, the second GPU is configured to fetch a pre-computed z-value from the coarse z-texture corresponding to the tile associated with each one of the tile quads.

18. The non-transitory computer-readable medium of claim 17, wherein, to generate the coarse z-buffer, the second GPU is configured to write to the coarse z-buffer the z-value from the coarse z-texture for each pixel in the plurality of pixels included in the associated tile.

19. The method of claim 1, wherein the configuring the first GPU to generate the coarse z-texture comprises down-sampling the z-buffer.

20. The non-transitory computer-readable medium of claim 11, wherein the configuring the first GPU to generate the coarse z-texture comprises down-sampling the z-buffer.

* * * * *